US010243597B2

(12) United States Patent
Leclerc et al.

(10) Patent No.: US 10,243,597 B2
(45) Date of Patent: *Mar. 26, 2019

(54) METHODS AND APPARATUS FOR COMMUNICATING WITH A RECEIVING UNIT

(71) Applicant: ESKI Inc., Montreal (CA)

(72) Inventors: Vincent Leclerc, Montreal (CA); Vadim Kravtchenko, Montreal (CA); Jean-Sébastien Rousseau, Montreal (CA); Justin Alexandre Francis, Montreal (CA)

(73) Assignee: ESKI Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,790

(22) Filed: Oct. 5, 2017

(65) Prior Publication Data

US 2018/0034489 A1 Feb. 1, 2018

Related U.S. Application Data

(63) Continuation of application No. 15/631,194, filed on Jun. 23, 2017, now Pat. No. 9,813,091, which is a
(Continued)

(51) Int. Cl.
*H04B 1/08* (2006.01)
*H04L 12/18* (2006.01)
(Continued)

(52) U.S. Cl.
CPC ............. *H04B 1/086* (2013.01); *A63J 5/02* (2013.01); *A63J 25/00* (2013.01); *G08B 21/182* (2013.01);
(Continued)

(58) Field of Classification Search
CPC .................... G08B 21/0288; G08B 25/10; G08B 21/0211; G06B 21/0453; H04W 4/008
See application file for complete search history.

(56) References Cited

U.S. PATENT DOCUMENTS

| 6,124,862 A | 9/2000 | Boyken et al. |
| 7,203,524 B2 | 4/2007 | Tushinsky et al. |
| (Continued) | | |

FOREIGN PATENT DOCUMENTS

| CA | 2901602 A1 | 7/2014 |
| CA | 2919749 A1 | 2/2015 |
| (Continued) | | |

OTHER PUBLICATIONS

Pending U.S. Appl. No. 15/688,163, filed Aug. 28, 2017.
(Continued)

*Primary Examiner* — Bobbak Safaipour
(74) *Attorney, Agent, or Firm* — Wolf, Greenfield & Sacks, P.C.

(57) ABSTRACT

In some embodiments, techniques are provided for extending the functionality of a receiving unit which is configured to express a state during an event. In some embodiments, a receiving unit configured to receive a first set of transmissions during an event from one or more transmitting units and express a state in response may also be configured to receive a second set of transmissions from other components at a time other than during the event and express a state in response to receiving the second set of transmissions.

16 Claims, 9 Drawing Sheets

Related U.S. Application Data continuation of application No. 15/376,113, filed on Dec. 12, 2016, now Pat. No. 9,722,649, which is a continuation of application No. PCT/CA2016/050684, filed on Jun. 14, 2016.

(60) Provisional application No. 62/201,351, filed on Aug. 5, 2015.

(51) Int. Cl.

| | |
|---|---|
| *A63J 5/02* | (2006.01) |
| *A63J 25/00* | (2009.01) |
| *G08B 21/18* | (2006.01) |
| *H04W 4/02* | (2018.01) |
| *H04W 8/00* | (2009.01) |
| *H04W 4/80* | (2018.01) |

(52) U.S. Cl.
CPC ......... *H04L 12/1895* (2013.01); *H04W 4/023* (2013.01); *H04W 4/80* (2018.02); *H04W 8/005* (2013.01)

(56) References Cited

U.S. PATENT DOCUMENTS

| | | | |
|---|---|---|---|
| 7,798,404 B2 | 9/2010 | Gelbman | |
| 8,475,367 B1 | 7/2013 | Yuen et al. | |
| 8,477,035 B2 | 7/2013 | Goldman et al. | |
| 8,502,480 B1 | 8/2013 | Gerszberg et al. | |
| 8,628,198 B2 | 1/2014 | Jalbout et al. | |
| 8,648,541 B2 | 2/2014 | Gerszberg et al. | |
| 8,660,369 B2 | 2/2014 | Llano et al. | |
| 8,740,391 B2 | 6/2014 | Leclerc et al. | |
| 8,798,926 B2 | 8/2014 | Stroila et al. | |
| 8,941,332 B2 | 1/2015 | Gerszberg | |
| 8,947,226 B2 | 2/2015 | Dugan | |
| 8,956,303 B2 | 2/2015 | Hong et al. | |
| 9,066,383 B2 | 6/2015 | Gerszberg | |
| 9,288,836 B1 * | 3/2016 | Clement | ............... H04W 84/18 |
| 9,474,137 B1 * | 10/2016 | Wein | ................... G06K 19/0702 |
| 9,686,843 B2 | 6/2017 | Van De Sluis et al. | |
| 9,722,649 B2 * | 8/2017 | Leclerc | ...................... A63J 5/02 |
| 9,788,152 B1 | 10/2017 | Leclerc et al. | |
| 9,813,091 B2 * | 11/2017 | Leclerc | ...................... A63J 5/02 |
| 9,813,857 B2 | 11/2017 | Leclerc et al. | |
| 2002/0199198 A1 | 12/2002 | Stonedahl | |
| 2003/0013459 A1 | 1/2003 | Rankin et al. | |
| 2003/0014330 A1 * | 1/2003 | Showghi | ......... G06Q 10/06312 705/7.22 |
| 2005/0093976 A1 | 5/2005 | Valleriano et al. | |
| 2006/0173701 A1 | 8/2006 | Gurvey | |
| 2007/0144047 A1 | 6/2007 | Singh | |
| 2008/0045806 A1 | 2/2008 | Keppler | |
| 2008/0046957 A1 | 2/2008 | Doffing et al. | |
| 2009/0032586 A1 * | 2/2009 | Hunt | ....................... G09F 23/00 235/382 |
| 2009/0270743 A1 | 10/2009 | Dugan et al. | |
| 2010/0013918 A1 | 1/2010 | Ta'Ead | |
| 2010/0085279 A1 | 4/2010 | Repko | |
| 2010/0285283 A1 * | 11/2010 | Kingsbury | ............. A42B 1/004 428/195.1 |
| 2010/0309000 A1 * | 12/2010 | Munthe-Kaas | .......... G08B 5/36 340/573.1 |
| 2011/0256886 A1 | 10/2011 | Velusamy | |
| 2011/0260830 A1 * | 10/2011 | Weising | ................... G06F 3/015 340/5.52 |
| 2011/0276396 A1 | 11/2011 | Rathod | |
| 2012/0072420 A1 | 3/2012 | Moganti et al. | |
| 2012/0233158 A1 | 9/2012 | Braginsky et al. | |
| 2012/0313759 A1 | 12/2012 | Markwitz et al. | |
| 2013/0046542 A1 | 2/2013 | Papakipos et al. | |
| 2013/0176142 A1 | 7/2013 | Drysdale et al. | |
| 2013/0185750 A1 | 7/2013 | Ayoub | |
| 2013/0231760 A1 | 9/2013 | Rosen et al. | |
| 2013/0254137 A1 | 9/2013 | Hunt | |
| 2013/0262298 A1 | 10/2013 | Morley | |
| 2013/0280682 A1 | 10/2013 | Levine et al. | |
| 2013/0286223 A1 | 10/2013 | Latta et al. | |
| 2013/0325887 A1 | 12/2013 | Takaoka | |
| 2014/0132181 A1 | 5/2014 | Gerszberg | |
| 2014/0172980 A1 | 6/2014 | Russell | |
| 2014/0184386 A1 * | 7/2014 | Regler | ................... G08B 5/228 340/7.61 |
| 2014/0205155 A1 | 7/2014 | Chung et al. | |
| 2014/0236769 A1 | 8/2014 | Drake et al. | |
| 2014/0270681 A1 * | 9/2014 | Sen | ......... G11B 31/00 386/201 |
| 2014/0344062 A1 | 11/2014 | Lamont | |
| 2015/0012308 A1 * | 1/2015 | Snyder | ................... G06Q 10/02 705/5 |
| 2015/0031294 A1 | 1/2015 | Holman et al. | |
| 2015/0145655 A1 | 5/2015 | Slupik | |
| 2015/0145656 A1 | 5/2015 | Levesque et al. | |
| 2015/0178532 A1 | 6/2015 | Brule | |
| 2015/0187206 A1 | 7/2015 | Saurin et al. | |
| 2015/0189056 A1 * | 7/2015 | Magi | ..................... G06F 1/1652 455/566 |
| 2015/0222517 A1 | 8/2015 | McLaughlin et al. | |
| 2015/0281009 A1 | 10/2015 | Melcher et al. | |
| 2015/0302310 A1 * | 10/2015 | Wernevi | ................. G16H 50/20 706/12 |
| 2015/0334772 A1 | 11/2015 | Wong et al. | |
| 2015/0341903 A1 | 11/2015 | Jeong et al. | |
| 2015/0381793 A1 | 12/2015 | Cerda et al. | |
| 2016/0007925 A1 * | 1/2016 | Mirov | .................. A61B 5/0059 356/400 |
| 2016/0042364 A1 | 2/2016 | Zamer et al. | |
| 2016/0071541 A1 | 3/2016 | Miner | |
| 2016/0174857 A1 | 6/2016 | Eggers et al. | |
| 2016/0192193 A1 | 6/2016 | Lee | |
| 2016/0205358 A1 | 7/2016 | Dickinson | |
| 2016/0247145 A1 * | 8/2016 | Grimaux | ................ G06Q 10/02 |
| 2016/0255068 A1 | 9/2016 | Pritchard et al. | |
| 2016/0316542 A1 * | 10/2016 | Wein | .................. G06K 19/0702 |
| 2016/0381488 A1 | 12/2016 | Kreitzer et al. | |
| 2017/0004685 A1 * | 1/2017 | Karsten | ............... G06F 19/3418 |
| 2017/0006414 A1 * | 1/2017 | Tomassini | ............ H04B 5/0037 |
| 2017/0010664 A1 * | 1/2017 | Tanaka | .................... G06F 1/163 |
| 2017/0048951 A1 * | 2/2017 | Huang | ............... H05B 37/0272 |
| 2017/0091205 A1 * | 3/2017 | Leclerc | ............... G06F 17/3087 |
| 2017/0093447 A1 | 3/2017 | Leclerc et al. | |
| 2017/0094459 A1 * | 3/2017 | Leclerc | ................... H04L 67/22 |
| 2017/0288711 A1 | 10/2017 | Leclerc et al. | |
| 2017/0289751 A1 | 10/2017 | Leclerc et al. | |
| 2017/0359684 A1 | 12/2017 | Leclerc et al. | |
| 2018/0035252 A1 | 2/2018 | Leclerc et al. | |
| 2018/0232384 A1 | 8/2018 | Leclerc et al. | |

FOREIGN PATENT DOCUMENTS

| | | |
|---|---|---|
| CN | 103975374 A | 8/2014 |
| CN | 104205785 A | 12/2014 |
| CN | 204215355 U | 3/2015 |
| CN | 104679234 A | 6/2015 |
| CN | 104065818 A | 9/2015 |
| WO | WO 2006/100513 A1 | 9/2006 |
| WO | WO 2014/100519 A1 | 6/2014 |
| WO | WO 2014/143997 A1 | 9/2014 |
| WO | WO 2014/182161 A2 | 11/2014 |

OTHER PUBLICATIONS

Pending U.S. Appl. No. 15/725,861, filed Oct. 5, 2017.
[No Author Listed], Budweiser Red Light Integrated. Buzz Products. Aug. 1, 2014. Available online at https://www.youtube.com/watch?v=moYlscwVDMo.
International Preliminary Report on Patentability for Application No. PCT/CA2016/050688 dated Jan. 9, 2018.
International Preliminary Report on Patentability for Application No. PCT/CA2016/050684 dated Feb. 15, 2018.

(56) References Cited

OTHER PUBLICATIONS

International Preliminary Report on Patentability for Application No. PCT/CA2016/050718 dated Nov. 30, 2017.
Pending U.S. Appl. No. 15/953,819, filed Apr. 16, 2018.
International Search Report and Written Opinion for Application No. PCT/CA2016/050684 dated Jul. 27, 2016.
International Search Report and Written Opinion for Application No. PCT/CA2016/050688 dated Aug. 19, 2016.
International Search Report and Written Opinion for Application No. PCT/CA2016/050778 dated Sep. 12, 2016.
International Search Report and Written Opinion for Application No. PCT/CA2016/050718 dated Sep. 23, 2016.
Chinese Office Action dated Jan. 4, 2019 in connection with Chinese Application No. 201680058316.3.

\* cited by examiner

METHODS AND APPARATUS FOR COMMUNICATING WITH A RECEIVING UNIT

RELATED APPLICATIONS

This application is a continuation of U.S. patent application Ser. No. 15/631,194, filed Jun. 23, 2017, entitled "Methods And Apparatus For Communicating With a Receiving Unit," which is a continuation of U.S. patent application Ser. No. 15/376,113, filed Dec. 12, 2016, entitled "Methods And Apparatus For Communicating With a Receiving Unit," which is a continuation of International Application No. PCT/CA2016/050684, filed Jun. 14, 2016, entitled "Methods And Apparatus For Communicating With A Receiving Unit," which claims priority under 35 U.S.C. § 119(e) to U.S. Provisional Application Ser. No. 62/201,351, filed Aug. 5, 2016, entitled "Methods And Apparatus For Communicating With A Receiving Unit." The entirety of each of the documents listed above is incorporated herein by reference.

BACKGROUND

Commonly assigned U.S. Pat. No. 8,740,391 (hereinafter "the '391 patent," which is incorporated herein by reference) discloses a system for providing a distributed manifestation within an environment. The system may include one or more transmitting units (referred to by the '391 patent as "projectors") which may transmit to a number of receiving units distributed throughout the environment. The receiving units may manifest a state change in response to receiving a transmission to create, for example, visual effects (e.g., changes in color, video, the presence or absence of light or an image, etc.) and/or effects which involve sound, shape, odor and/or other sensory stimuli. State change manifestations may be for a fixed period of time, or dynamic (e.g., receiving units may change state in real time, or be perceived to do so). In some embodiments disclosed by the '391 patent, a receiving unit may comprise a wearable device, which is a device or collection of components that may be worn, carried or otherwise transported by a user, such as an attendee at an event.

In some embodiments disclosed by the '391 patent, a transmitting unit generates electromagnetic signals having wavelengths in the infrared, visible and/or ultraviolet spectra. An electromagnetic signal may be encoded to convey information to a receiving unit that receives the transmission. The information may include state information which corresponds to location (e.g., spatial coordinate) data. A receiving unit located within the environment receives the electromagnetic signal from the transmitter and decodes the signal to discern state data associated with its location (e.g., spatial coordinates within the environment). The receiving unit then may express a state in accordance with the state data as a result of being situated at its location at the time the transmission was received and processed.

A representative receiving unit 32 is shown in FIG. 1. Receiving unit 32 includes a receiver 34, a state changing component 54 which enables the receiving unit to express a state, and a power source 64 for powering the receiver and the state changing component 54. Receiver 34 may, for example, comprise a sensor for receiving a signal of a particular wavelength (e.g., an infrared sensor for receiving a signal having an infrared wavelength), and/or one or more other components suitably configured to allow the receiving unit to communicate with other modules (e.g., transmitting units). State changing component 54 may, for example, include one or more light emitting diodes or other components for manifesting a visual display.

SUMMARY

Conventionally, the functionality of a receiving unit which is used to create a manifestation within an environment during an event expires once the event concludes. For example, receiving units that are worn by attendees and are used to create visual displays at concerts or sporting events conventionally do not create further visual effects once the event is over. That is, although an event attendee may keep a wearable device or other type of receiving unit as a souvenir from the event, the receiving unit does not actively interact with other components after the event concludes.

The Assignee has appreciated, however, that a receiving unit which continues to provide functionality after an event concludes may provide significant benefits for event attendees, organizers and attractions. For example, a receiving unit which is capable of expressing a state in response to stimuli after an event is over may extend and/or augment the attendee's experience at the event, thereby deepening his/her connection with acts, teams, proceedings, organizations or other attractions viewed or interacted with at the event, and provide the acts/teams/organizations/etc. and/or event organizers a valuable vehicle for continued communication with event attendees after the event is over.

Accordingly, some embodiments of the invention provide techniques for extending the functionality of a receiving unit after an event concludes. In some embodiments, a receiving unit may comprise components which enable it to receive transmissions not only from one or more transmitting units during an event, but also other components (e.g., a mobile device operated by the attendee, a server component, a networking component (e.g., a gateway, hub, router, etc.), other component(s), or some combination thereof) after the event concludes. For example, a receiving unit may be suitably configured to receive emissions from a transmitting unit during an event (e.g., electromagnetic signals transmitted directionally in the infrared, visible and/or ultraviolet spectra, non-directionally transmitted signals, etc.), and to receive transmissions via a direct connection (e.g., via one or more networks) from another component after the event concludes. In some embodiments, then, the functionality which is provided by a receiving unit during an event may be extended after the event concludes, using devices which an attendee may already have in his/her possession, and/or commonly available communication technologies, in ways which may significantly augment and enrich the attendee's engagement with the event and the acts, athletes or other attractions experienced at the event.

The foregoing is intended as a non-limiting summary of only certain aspects of the invention. Some embodiments of the invention are described in more detail below.

BRIEF DESCRIPTION OF DRAWINGS

The accompanying drawings are not intended to be drawn to scale. In the drawings, each identical or nearly identical component illustrated in the various figures is represented by a like numeral. For purposes of clarity, not every component may be labeled in every drawing. In the drawings.

DESCRIPTION

In accordance with some embodiments of the invention, techniques are provided for extending the functionality of a receiving unit which is configured to express a state during an event. For example, in some embodiments, a receiving unit which is configured to receive a first set of transmissions during an event from one or more transmitting units and, for example, express a state in response may also be configured to receive a second set of transmissions from other components after the event concludes and, for example, express a state in response to receiving the second set of transmissions. As an example, a receiving unit may be configured to receive transmissions (e.g., directionally transmitted electromagnetic signals in the infrared, visible and/or ultraviolet spectra, non-directionally transmitted signals, etc.) from a transmitting unit during an event, and to receive transmissions via direct connection (e.g., via one or more networks) from one or more components after the event concludes. Receipt of the emission(s) during the event and/or of the transmission(s) via direct connection after the event concludes may, for example, cause the receiving unit to express a state (e.g., a state which is the same during the event and after the event concludes, or different). As such, the functionality of a receiving unit which manifests a state during an event may be extended. This extension may significantly augment and enrich the attendee's engagement with the event, its organizers, and/or and the acts, athletes or other attractions that the attendee experienced during the event.

It should be appreciated that the term "event" is used herein to refer to any suitable period(s) of interaction between a host and an attendee. A host may comprise any suitable entity or organization. Thus, while many of the embodiments described herein relate to events which are concerts, festivals, sporting events, etc., it should be appreciated that the invention is not limited to events at which large numbers of attendees congregate, or to any particular type of interaction between a host and attendee. For example, an event may comprise a commercial interaction between a host commercial entity and attendee customer who visits one of the host's retail locations, an exhibition organized by a host museum for a relatively small number of attendee visitors, non-commercial interactions (e.g., charitable events organized by host philanthropic organizations, educational events organized by host educational institutions, etc.), and/or any other suitable occurrence at which a host entity interacts with one or more attendees.

Figure 2:
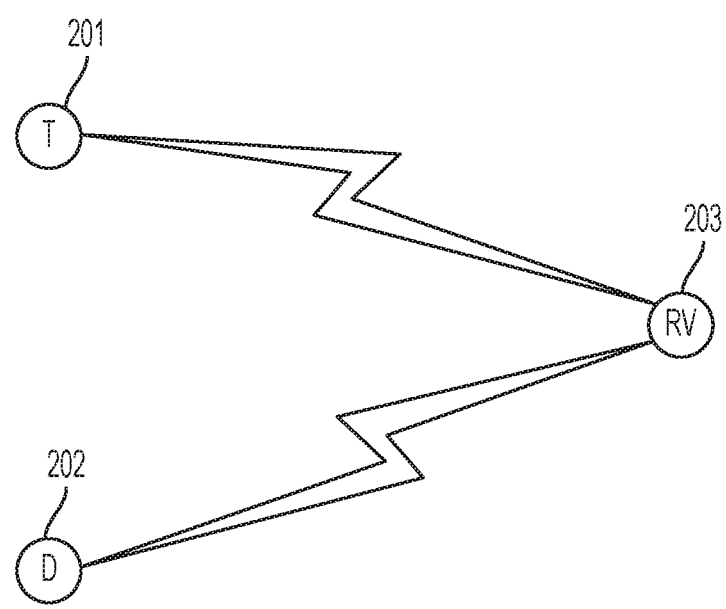
FIG. 2 is a block diagram depicting a representative arrangement in which a receiving unit may receive transmissions before, during and/or after an event, in accordance with some embodiments of the invention.

FIG. 2 depicts a representative arrangement 100 which includes a receiving unit configured to receive and process transmissions before, during and/or after an event, in accordance with some embodiments of the invention. In arrangement 100, receiving unit 203 receives transmissions from transmitting unit 201 during an event, and from device(s) 202 at times other than during the event. Receiving unit 203 may take any of numerous forms. For example, in some embodiments, receiving unit 203 may comprise a stand-alone item that an attendee may wear, hold, carry and/or transport, such as a wristband, hat, necklace, badge, medal, eyeglasses, ball, etc. In other embodiments, receiving unit 203 may comprise one or more modules which interact with other components, such as an application which executes on a device operated by an attendee (e.g., a mobile device, such as a so-called "smartphone," tablet computer, laptop computer, gaming console, music player, etc.) or other component(s).

Receiving unit 203 may include components which enable it to express a state in response to receiving a transmission. In some embodiments, an expression of state may be perceptible by an attendee, and may include (for example) a visual display, creation of sound, a change to the receiving unit's appearance, a vibration or other tactile sensation, creation of an odor, and/or any other suitable perceptible expression of state. Of course, receiving unit 203 is not limited to expressing a state in a manner which is perceptible by an attendee. For example, receiving unit 203 may receive from transmitting unit 201 a signal which comprises data to be recorded or otherwise acknowledged by receiving unit 203. As a result, a state expression may include (as examples) incrementing a counter indicating places visited, other attendees met, songs heard, products viewed, etc., and/or or logging information such as time stamps associated with various occurrences. In addition, in some embodiments, receiving unit 203 may have the capability to transmit information (using any suitable transmission component(s) and/or technique(s)), and a state expression may include a transmission intended for one or more other components (e.g., a mobile device, server component, networking component, etc.). A receiving unit may express any suitable state, whether perceptible by an attendee or not, in any suitable manner, as the invention is not limited in this respect.

When multiple receiving units 203 are distributed in an environment, the receiving units may be used to create a display, and/or other perceptible expressions of state, during the event. Being part of such a distributed manifestation within an environment during an event may increase each attendee's level of engagement with and emotional attachment to the event, the attraction(s) experienced during the event, and the receiving unit itself. Event organizers, recognizing this emotional attachment, often allow attendees to keep the receiving units when the event finishes as a souvenir and memento of their experience at the event.

The transmissions received from transmitting unit 201 during an event may take any suitable form. For example, forms of transmission disclosed in the '391 patent include directionally transmitted electromagnetic signals in the ultraviolet, visible and infrared spectra. Other forms of transmission may include non-directionally transmitted signals, such as via radio or other waveforms.

Figure 1:
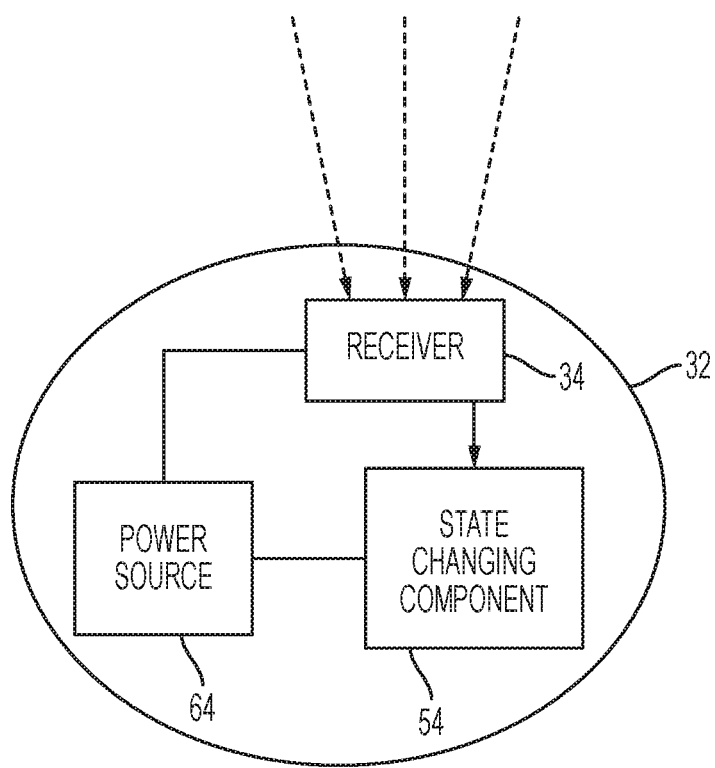
FIG. 1 is a block diagram depicting a representative receiver unit.

In the arrangement depicted in FIG. 1, receiving unit 203 receives transmissions at times other than during the event from device(s) 202, which may comprise any suitable component(s). For example, device(s) 202 may comprise a mobile device (e.g., operated by an event attendee before or after the event), a server component, a networking component, and/or any other suitable device(s).

In some embodiments, receiving unit 203 may receive transmissions at times other than during an event via a direct connection with device(s) 202. For example, in some embodiments, a transmission may be sent and received via one or more networks, of which device(s) 202 and receiving unit 203 comprise nodes. A network used to communicate with receiving unit 203 may take any suitable form. For example, a network may enable wired and/or wireless transmissions, may employ pre-existing communications infrastructure and/or be ad hoc in nature, and may employ any suitable communication technique(s) and/or protocol(s). As such, communications with receiving unit 203 at times other than during an event may be accomplished using any suitable components and communication technologies, including components and technologies which are now known or later developed.

Figure 3:
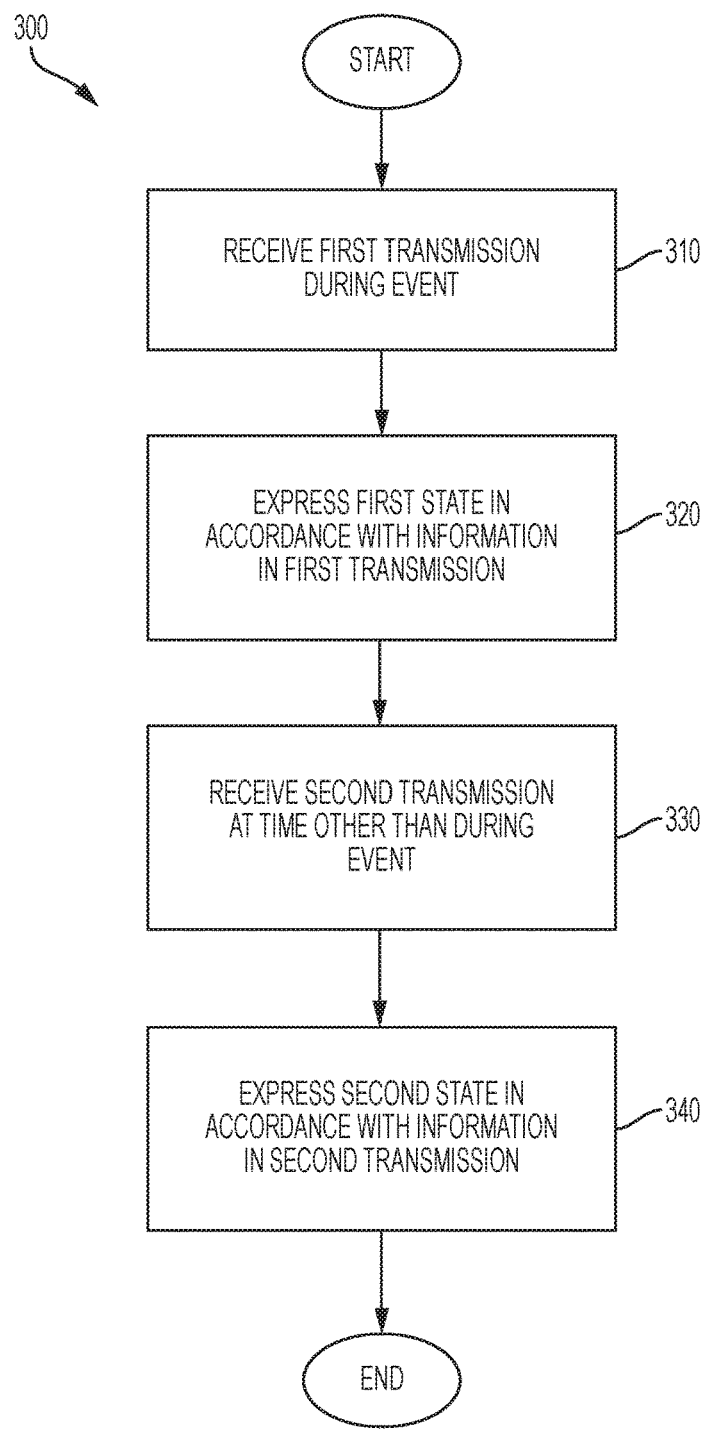
FIG. 3 is a flowchart depicting a representative process whereby a receiving unit may receive transmissions before, during and/or after an event, in accordance with some embodiments of the invention.

FIG. 3 depicts a representative process 300 whereby a receiving unit may express a state change in response to a transmissions received during an event, and at a time other than during an event. At the start of process 300, in act 310, a receiving unit (e.g., receiving unit 203 shown in FIG. 1) receives a first transmission from a transmitting unit during an event (e.g., an electromagnetic signal sent via directional transmission). Then, in act 320, the receiving unit expresses a first state in accordance with information included in the first transmission. For example, the receiving unit may manifest a state change indicated by state information which correlates with a particular location indicated in the first transmission, as a result of the receiving unit being at the indicated location at the time the first transmission was received, as disclosed in the '391 patent.

Representative process 300 then proceeds to act 330, wherein the receiving unit receives a second transmission at a time other than during the event. For example, the second transmission may be received before or after the event. In some embodiments, the second transmission may be received via a direct connection (e.g., via one or more networks) from a component such as a mobile device, server component, networking component, and/or any other suitable component(s). In act 340, the receiving unit then expresses a second state in accordance with information included in the second transmission. Representative process 300 then completes.

It should be appreciated from the foregoing description of representative process 300 that the acts shown in FIG. 3 need not be performed in the sequence described above (e.g., the second transmission may be received before an event at which the first transmission is received), and may be performed in any suitable sequence. It should also be appreciated that the first and second states expressed by the receiving unit need not be different states. For example, the receiving unit may manifest the same form(s) of visual effect during an event and at a time other than during the event, such as to remind an attendee after an event of a particular visual effect which he/she witnessed during the event.

Figure 4:
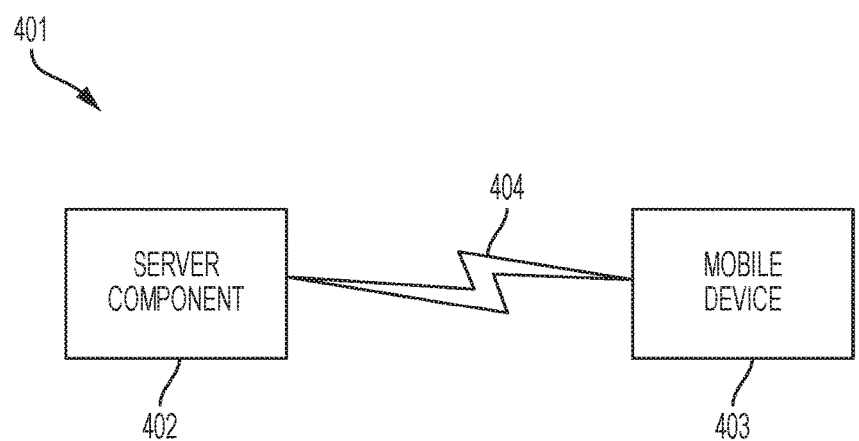
FIG. 4 is a flowchart depicting a representative mode of interaction in which a receiving unit may receive transmissions from a server component, in accordance with some embodiments of the invention.

FIG. 4 depicts a representative mode of interaction with a receiving unit. Specifically, FIG. 4 depicts a mode of interaction 401 wherein a server component 402 communicates via connection 404 with a mobile device 403 which is configured to act as a receiving unit at a time other than during an event. As noted above, a mobile device 403 may comprise any suitable device, such as a smartphone, tablet device, laptop computer, gaming console, music player, or other device. Server component 402 may cause mobile device 403 to express a state using any suitable functionality (whether native or non-native to the mobile device), such as by causing information to be displayed on the mobile device's screen, causing the mobile device to vibrate, causing sound to be emitted from the mobile device's speaker, and/or any other suitable functionality.

The mobile device 403 may be configured to act as a receiving unit in any suitable fashion. For example, in some embodiments configuration may be accomplished via the installation and execution of one or more applications on the mobile device. A server component 402 may comprise any suitable hardware and/or software component(s), and if implemented at least partially via software, need not execute on the same physical hardware.

In some embodiments, connection 404 may comprise one or more network(s) (not shown in FIG. 4). As noted above, if one or more networks are used, each network may employ any suitable communication protocol(s) and/or technique(s), and comprise any suitable communication infrastructure. For example, server component 402 may communicate with mobile device 403 via IEEE 802.11, Bluetooth, and/or any other suitable protocol(s). The invention is not limited to any particular mode of implementation.

Server component 402 may communicate with mobile device 403 configured to function as a receiving unit at a time other than during an event for any of numerous reasons. For example, server component 402 may be operated by an entity associated with an event (e.g., the event organizer, an artist, team or other attraction associated with an event, etc.) and may communicate with mobile device 403 at a time other than during an event to provide notifications (e.g., of upcoming events, a new song, album, tour date or information released by a musical artist, future attractions, etc.), service alerts (e.g., the availability of new applications or versions for installation on the mobile device, etc.). Any suitable information may be communicated to a mobile device 403 configured to function as a receiving unit, as embodiments of the invention are not limited in this respect.

Figure 5:
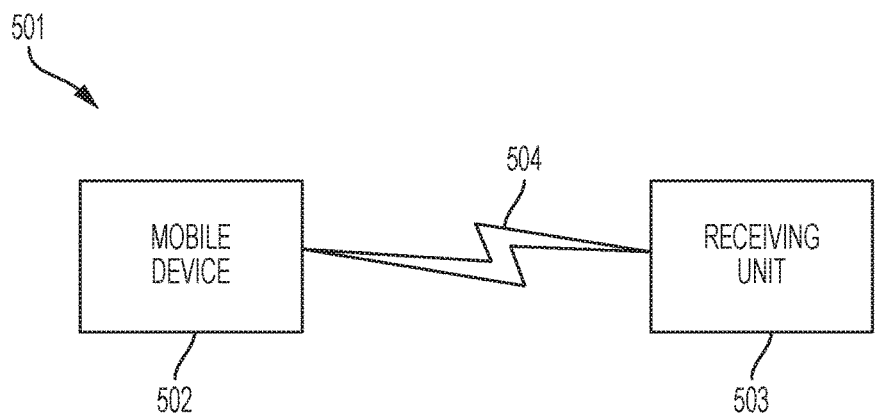
FIG. 5 is a block diagram depicting a representative mode of interaction in which a receiving unit may receive transmissions from a mobile device, in accordance with some embodiments of the invention.

FIG. 5 depicts another representative mode of interaction 501 at a time other than during an event. Specifically, FIG. 5 depicts a mode of interaction which involves a mobile device 502 communicating via connection 504 with a receiving unit 503. In mode of interaction 501, the user may employ an application (not shown in FIG. 5) executing on mobile device 502 to communicate with receiving unit 503. For example, a user of mobile device 502 may employ the application to effect a change of state by the receiving unit, and/or program the mobile device 502 and/or receiving unit 503 to effect a change in state in response to one or more defined stimuli. As an example, a promoter of an artist's musical concert may specify that when the mobile device 502 plays a particular song by the artist, an application executing on the device is to instruct the receiving unit 503 to create a similar visual display to one which was presented by the receiving unit at the concert when the same song was played, so as to remind or recreate the feelings experienced by the concert attendee when the song was played.

It should be appreciated that although one receiving unit 503 is shown in FIG. 5, the invention is not limited to a mobile device 502 controlling only a single receiving unit 503. For example, in some embodiments, a mobile device 502 may issue instructions to multiple receiving units 503 via multiple connections 504. Such instructions may be similar for all receiving units in communication with mobile unit 502, or one set of instructions may be directed to one subset of receiving units 503 and another set of instructions may be directed to another subset.

Further, in some embodiments of the invention, a receiving unit 503 may be capable of not only receiving information (e.g., instructions) from a mobile device, but also transmitting information to the mobile device, such as information indicating the receiving unit's status, location and/or other characteristics. As such, some embodiments of the invention may enable the user of a mobile device to employ an application to query a receiving unit.

Any suitable functionality may be realized via one- or two-way communication between a mobile device 502 and one or more receiving units 503. For example, the user of the mobile device may instruct a particular receiving unit to change color, instruct multiple receiving units (e.g., the wearable devices within a certain distance from the user) to change color, discover the receiving units which are nearby the mobile device, determine the distance between the receiving unit(s) and mobile device (e.g., using a received signal strength indication (RSSI) from the receiving unit(s)), or forward notifications received on the mobile device to one or more receiving units. For example, the mobile device may instruct a receiving unit to change state in response to the mobile device receiving a new text message, social network status update, schedule notification, reminder and/or other form of notification. Any suitable information, originating from any suitable source, may spawn instructions to a receiving unit to change state.

Figure 6:
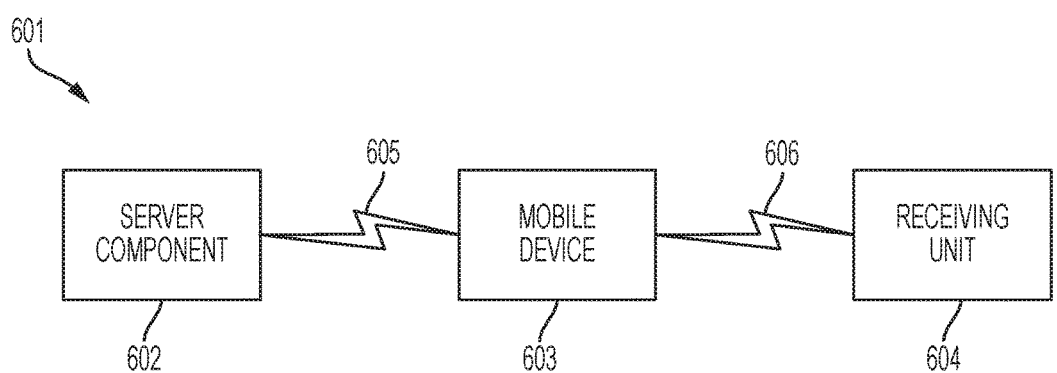
FIG. 6 is a block diagram depicting a representative mode of interaction in which a receiving unit may receive transmissions from a server via a mobile device, in accordance with some embodiments of the invention.

FIG. 6 depicts another representative mode of interaction 601 with a receiving unit at a time other than during an event. Specifically, mode of interaction 601 involves a server component 602, mobile device 603 and receiving unit 604. This mode of interaction is similar in some respects to the mode of interaction 501 described above with reference to FIG. 5, except that communications with the receiving unit (e.g., to instruct the receiving unit to express a state) originate with server component 602 rather than mobile device 603. As such, the mobile device 603 may serve as a conduit or data processing intermediary for communication between the server component 602 and receiving unit 604. It should be appreciated that although only one server component 602, mobile device 603 and receiving unit 604 is shown in FIG. 6, mode of interaction 601 may involve plural server components 602, mobile devices 603 and receiving units 604. For example, a server component 602 may communicate with multiple mobile devices 603, and each mobile device may communicate with multiple receiving units 604. Such communication may be two-way, so that server component 602 may send information to, or receive information from, one or more receiving units 604 via one or more mobile devices 603.

Any suitable functionality may be achieved via communication between server component 602 and one or more receiving units 604 via one or more mobile devices 603. For example, server component 602 may issue a notification to a mobile device 603 (e.g., mobile devices which execute an application that communicates with server component 602) that a musical artist just announced new tour dates in the geographic area in which the mobile devices are located. Each mobile device 603 that receives the notification may issue instructions to one or more receiving units 604 to change state, such as to immediately notify the user of each receiving unit to shop for tickets before the shows sell out.

As another example, a receiving unit 604 may express a state in response to a mobile device 603 capturing certain information and notifying server component 602. For example, an application executing on the mobile device may determine that a predefined event has occurred and/or that predetermined conditions have been satisfied, and send instructions to the receiving unit to express a state as a result of processing performed by the application, and/or in response to receiving instructions from a server component. One representative mode of implementation relates to a mobile device application detecting an environmental stimulus, such as a reaction by the wearer of a receiving unit to happenings during an event. For example, when the wearer of a receiving unit cheers for their team at a sporting event (e.g., as a result of a goal being scored), the mobile device application may detect (e.g., through its microphone) the increase in noise and automatically send instructions to the receiving unit to express a state (e.g., to light up, vibrate, etc.) when the noise reaches a threshold level, to augment the wearer's experience at the event. Further, the mobile device may transmit an indication that increased noise was detected to a server component, and the server component may respond with information that may be processed (e.g., displayed) by the mobile device, the receiving unit or both. For example, the server component may respond to the indication with statistics about the game, the player that scored the goal, etc., and these statistics may be displayed by the mobile device, the wearable device, etc.

As another example, a receiving unit may be instructed to express a state as part of a voting exercise. For example, if an artist at a concert asks audience members to vote on the song that should be played next, cheers as votes for each song choice may be detected by mobile devices used by audience members. These mobile devices may then instruct receiving units worn by audience members to express a state, as a result of processing performed by the mobile devices, one or more external (e.g., server) components to which an indication of the detected noise level was transmitted, or both. As an example, if one song is chosen then the receiving units may be instructed to express a first state (e.g., light up in a first color) and if another song is chosen the receiving units may be instructed to express a second state (e.g., light up in a second color). The mobile device(s) may also, or alternatively, express a state as a result of the vote. For example, the mobile device(s) may be instructed to display the sound levels detected for each song choice.

Of course, it should be appreciated that the invention is not limited to being used by attendees who are physically present at an event. Using the example given above of a sporting event to illustrate, the cheers detected by the mobile device may be those from fans at a bar which the user is visiting during the game. For example, the mobile device may transmit an indication of the detected noise, and/or any other environmental condition(s), to a server component via one or more networks comprising any suitable infrastructure, and the server component may respond with information to be processed by the mobile device, the receiving unit, or both. The invention is not limited to being employed in any particular setting.

It should also be appreciated that the invention is not limited to causing receiving units to express a state as a result of environmental conditions. Detection of any suitable type of condition and/or satisfaction of any suitable criteria may cause a receiving unit to express a state. As examples, the detection of biometric data, movement-related data, proximity-related data, and/or any other suitable type(s) of data, by a receiving unit, mobile device and/or other component may trigger an expression of state by a receiving unit.

It should also be appreciated that the reaction to such condition detection/criteria satisfaction is not limited to a receiving unit expressing a state. For example, a condition being detected may trigger a capture of information, of any suitable type(s), by any suitable component(s). For example, the detection of certain environmental conditions, certain biometric data, etc., may cause a receiving unit, mobile device, and/or any other suitable component(s) to start capturing information. For example, in response to detecting a certain level of crowd noise at a sporting event, a mobile device and/or external component may start capturing content, such as images, sound and/or video, to create a memento of the event for the user. In response to detecting that the wearer of a receiving unit is likely skiing (e.g., due to surrounding temperature and user acceleration information), a mobile device and/or external component(s) may start capturing the user's speed, acceleration, number of jumps, etc., and a receiving unit may begin capturing biometric data such as heart rate, calories expended, etc. In response to detecting that a certain person has come into close proximity (e.g., as a result of information sent by that person's mobile device being detected), a user's mobile device and/or external component(s) may begin capturing images, sound, video, etc. to create a record of the interaction with the person. Any suitable condition(s) being detected may cause any suitable type(s) of information to be captured, as the invention is not limited in this respect.

Figure 7:
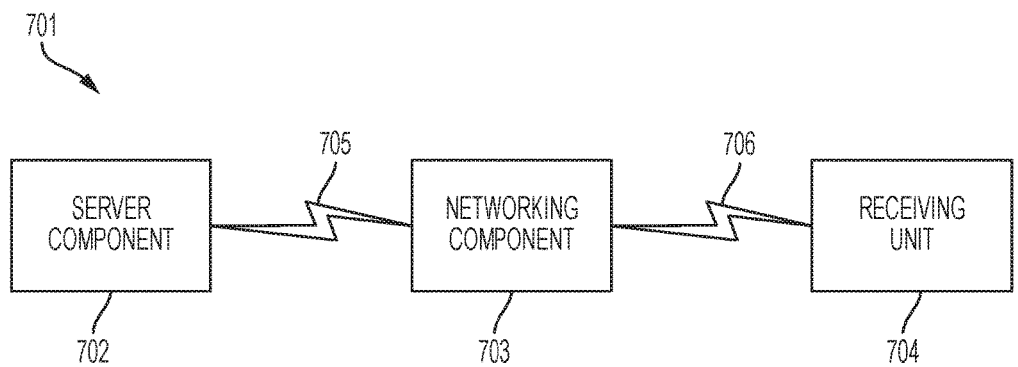
FIG. 7 is a block diagram depicting a representative mode of interaction in which a receiving unit may receive transmissions from a server via a networking component, in accordance with some embodiments of the invention.

FIG. 7 depicts another representative mode of interaction 701 at a time other than during an event. Specifically, mode of interaction 701 involves a server component 702, networking component 703 and receiving unit 704. This mode of interaction is similar in some respects to the mode of interaction 601 described above with reference to FIG. 6, except that instead of communications between the server component and receiving unit flowing through a mobile device, they instead flow through networking component 703, which may include (as examples) a hub, router, gateway and/or any other suitable networking component(s) configured to function as a conduit for communications between one network node and another.

In some embodiments, communication via a networking component 703 rather than a mobile device may enable different communication protocols to be employed for communication between server component 702 and receiving unit 704. For example, use of networking component 703 may enable certain forms of the Internet Protocol (IP) to be used such as IPv6, 6loWPAN, etc., which may have (as an example) favorable power consumption characteristics when compared with other communication protocols.

Figure 8:
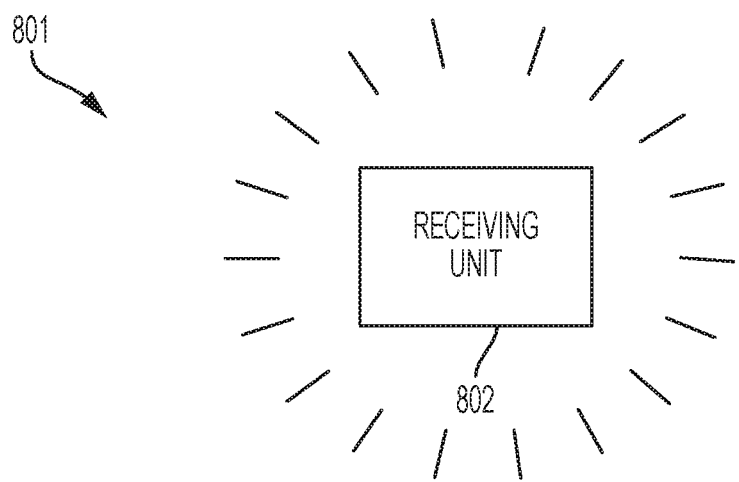
FIG. 8 is a block diagram depicting a receiving unit suitably configured to express a state before, during and/or after an event concludes, in accordance with some embodiments of the invention.

FIG. 8 depicts a mode of operation 801 in which a receiving unit expresses a state change automatically, rather than in response to communicating with other components like a mobile device, server component and/or networking component. For example, a receiving unit user may have been previously programmed to automatically express a state in response to a stimulus (e.g., to act as a beacon in response to an event occurring, such as certain information being received at the receiving unit; to modify stored data in response to specified input being received, such as to increment a counter when the receiving unit comes into proximity with a mobile device and/or other component, which counter may later be transmitted by the receiving unit; etc.), and/or in response to a predefined period of time passing. Alternatively, receiving unit 802 may be configured to express a state in response to user input (e.g., to act as an autonomous lighting element, such as a blinking bicycle light, or sound maker, such as an emitter of an audible alarm, in response to user input, such as the receiving unit being tapped or a button thereon being pressed). A receiving unit 802 may be configured to express a state in response to any of numerous forms of input and in any of numerous circumstances.

The Assignee has recognized that enabling receiving units to manifest state changes in response to instructions received from external components at times other than during an event may create opportunities for mischief during the event itself. For example, mischievous operators of external components could attempt to issue instructions to receiving units which are inconsistent with other instructions issued by event organizers, thereby disrupting visual displays or other planned expressions of state within an environment. As a result, some embodiments of the invention may provide mechanisms for achieving control over receiving units during an event. For example, some embodiments may enable receiving units to be "locked" so that they are only responsive to instructions from authorized transmitting units during an event. Other embodiments may block applications executing on external devices from communicating with receiving units until a point in time at which such communication is enabled, which may occur a set amount of time after the event concludes, or may be manually activated by an operator (e.g., through a server component). Still other embodiments may require an external component such as a mobile device to obtain authorization (e.g., from a server component operated by an event organizer) before the component may communicate with a receiving unit. Still other embodiments may provide for transmitting units in use at an event to be configured to regain control and lock receiving units from being externally controlled if mischief is detected. Any suitable technique(s) may be used to maintain and/or regain control over one or more receiving units during an event.

The Assignee has also recognized that receiving units may serve as a valuable tool for communication with a prospective event attendee prior to an event occurring. For example, a receiving unit may be provided to a prospective event attendee before the event is scheduled to occur, and the receiving unit may be programmed or otherwise configured (e.g., using any of the modes of interaction and/or operation described above) to manifest a state so as to communicate with the prospective attendee. For example, a receiving unit may be programmed to create a visual display to remind a prospective attendee that the event is upcoming, or to inform the prospective attendee that an alert or notification relating to the event has been issued. Receiving units may be distributed to prospective event attendees in any suitable fashion. For example, a receiving unit may be sent directly to someone who purchases a ticket for an event online, or may be handed out in public places (e.g., malls, airports, restaurants, public transportation stations and vehicles, parks, etc.) to encourage attendance at the event, raise public awareness, increase enthusiasm, and allow fans to recognize other attendees, thereby fostering a sense of unity among them.

It should be appreciated that references above to interactions with a receiving unit "at times other than during an event" do not preclude interacting with a receiving unit which is initially used during a first event as other events occur. For example, an attendee may attend a first event (e.g., a first concert by a musical artist) and take home a receiving unit from the event. The attendee may later watch a second concert (e.g., in person, online or on television) by the same or a different artist, and the receiving unit may (e.g., in response to receiving a signal from a server component, mobile device, networking component, other receiving unit, or a combination thereof) express a state, such as a state which is similar to one which it expressed during the first concert. For example, the receiving unit may present visual effects as the second concert is ongoing which are similar to effects presented during the first concert. The receiving unit may transmit back to the server component, mobile device, networking component and/or other receiving unit information relating to the second expression of state, such as an identifier, data collected by one or more sensors, indications of input received (e.g., to communicate an attendee's affinity for the state expressed by the receiving unit and/or the occurrence at the second event that triggered it), and/or any other suitable information.

Similarly, an attendee may view a replay of an event that she previously attended, and the receiving unit may express a state which is similar to a state that it expressed during the original show. For example, the receiving unit may present visual effects which are the same or similar to effects presented during the original concert. Such visual effects may, for example, be controlled by an application executing on the attendee's mobile device (which may, for example, also be used to control the replay of the concert), so that the application may cause the receiving unit to express a state in synchronicity with audio content.

Figure 9:
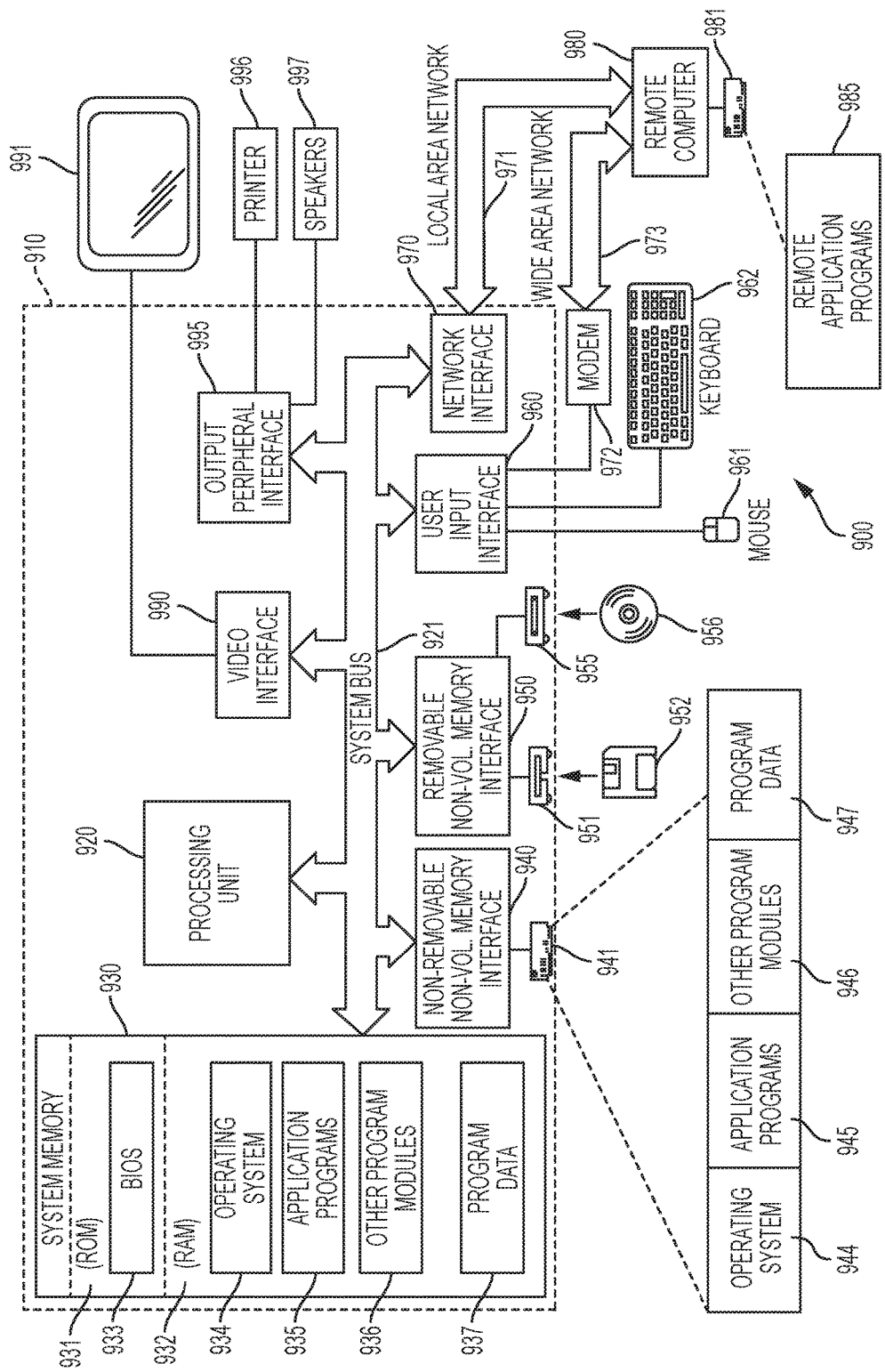
FIG. 9 is a block diagram depicting an example computing system with which some aspects of the invention may be implemented.

FIG. 9 depicts a general purpose computing device, in the form of a computer 910, which may be used to implement certain aspects of the invention. For example, computer 910 or components thereof may constitute any of the mobile devices, server components and/or networking components described above.

In computer 910, components include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 910. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 939, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 959 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 949, and program data 947. Note that these components can either be the same as or different from operating system 934, application programs 935, other program modules 539, and program data 937. Operating system 944, application programs 945, other program modules 949, and program data 947 are given different numbers here to illustrate that, at a minimum, they are different copies. A user may enter commands and information into the computer 910 through input devices such as a keyboard 992 and pointing device 991, commonly referred to as a mouse, trackball or touch pad. Other input devices (not shown) may include a microphone, joystick, game pad, satellite dish, scanner, or the like. These and other input devices are often connected to the processing unit 920 through a user input interface 590 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 999, which may be connected through a output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 990, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Embodiments of the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium. Examples of computer readable media which are not computer readable storage media include transitory media, like propagating signals.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which an example has been described. The acts performed as part of the method may be ordered in any suitable way. Accordingly, embodiments may be constructed in which acts are performed in an order different than illustrated, which may include different acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising acts of:
   (A) during an event at which a musical artist performs music in an event venue, causing a wearable receiving unit to manifest a first state change via transmission, from at least one first location at the event venue, of at least one signal to the at least one wearable receiving unit; and
   (B) after the event, causing the wearable receiving unit to manifest a second state change, via transmission to the wearable receiving unit of at least one signal by a mobile device at a location other than that at the event venue, in response to the mobile device detecting music performed by the musical artist.

2. The method of claim 1, wherein the first state change is different than the second state change.

3. The method of claim 1, wherein the at least one signal from mobile device is transmitted as result of the mobile device executing programmed instructions, and wherein the act (B) comprises causing the mobile device to execute the programmed instructions.

4. The method of claim 1, wherein the at least one signal from the mobile device is transmitted as result of a component other than the mobile device executing programmed instructions, and wherein the act (B) comprises causing the component other than the mobile device to execute the programmed instructions.

5. The method of claim 1, wherein manifesting the first state change and/or manifesting the second state change involves one or more of creating a visual display, creating sound, changing appearance, vibrating, creating a tactile sensation, and creating an odor.

6. An apparatus, comprising:
at least one computer-readable storage medium, having instructions encoded thereon; and
at least one computer processor, programmed via the instructions to:
during an event at which a musical artist performs music in an event venue, cause a wearable receiving unit to manifest a first state change via transmission, from at least one first location at the event venue, of at least one signal to the at least one wearable receiving unit; and
after the event, cause the wearable receiving unit to manifest a second state change, via transmission to the wearable receiving unit of at least one signal by a mobile device at a location other than that at the event venue, in response to the mobile device detecting music performed by the musical artist.

7. The apparatus of claim 6, wherein the first state change is different than the second state change.

8. The apparatus of claim 6, wherein the at least one signal from mobile device is transmitted as result of the mobile device executing programmed instructions, and wherein the at least one computer processor is programmed to cause the mobile device to execute the programmed instructions.

9. The apparatus of claim 6, wherein the at least one signal from the mobile device is transmitted as result of a component other than the mobile device executing programmed instructions, and wherein the at least one computer processor is programmed to cause the component other than the mobile device to execute the programmed instructions.

10. The apparatus of claim 6, wherein manifesting the first state change and/or manifesting the second state change involves one or more of creating a visual display, creating sound, changing appearance, vibrating, creating a tactile sensation, and creating an odor.

11. At least one computer-readable storage medium having instructions encoded thereon which, when executed by a computing system, cause the computing system to perform a method comprising acts of:
(A) during an event at which a musical artist performs music in an event venue, causing a wearable receiving unit to manifest a first state change via transmission, from at least one first location at the event venue, of at least one signal to the at least one wearable receiving unit; and
(B) after the event, causing the wearable receiving unit to manifest a second state change, via transmission to the wearable receiving unit of at least one signal by a mobile device at a location other than that at the event venue, in response to the mobile device detecting music performed by the musical artist.

12. The at least one computer-readable storage medium of claim 11, wherein the first state change is different than the second state change.

13. The at least one computer-readable storage medium of claim 11, wherein the at least one signal from mobile device is transmitted as result of the mobile device executing programmed instructions, and wherein the act (B) comprises causing the mobile device to execute the programmed instructions.

14. The at least one computer-readable storage medium of claim 11, wherein the at least one signal from the mobile device is transmitted as result of a component other than the mobile device executing programmed instructions, and wherein the act (B) comprises causing the component other than the mobile device to execute the programmed instructions.

15. The at least one computer-readable storage medium of claim 11, wherein manifesting the first state change and/or manifesting the second state change involves one or more of creating a visual display, creating sound, changing appearance, vibrating, creating a tactile sensation, and creating an odor.

16. A method, comprising acts of:
(A) during an event at which each of a plurality of users is provided a corresponding wearable receiving unit, causing at least one of the wearable receiving units to manifest a first state change via transmission, from at least one first location, of at least one electromagnetic signal to the at least one wearable receiving unit; and
(B) causing the at least one wearable receiving unit to manifest a second state change at a time other than during the event, the second state change comprising the at least one wearable receiving unit capturing information relating to an environmental condition detectable by the at least one wearable receiving unit and transmitting at least one signal in response to capturing the information.

* * * * *